(12) United States Patent
Ji et al.

(10) Patent No.: US 12,272,024 B2
(45) Date of Patent: Apr. 8, 2025

(54) TRAINING METHOD OF IMAGE PROCESSING MODEL, IMAGE PROCESSING METHOD, APPARATUS, AND DEVICE

(71) Applicant: TENCENT TECHNOLOGY (SHENZHEN) COMPANY LIMITED, Shenzhen (CN)

(72) Inventors: Xiaozhong Ji, Shenzhen (CN); Yun Cao, Shenzhen (CN); Ying Tai, Shenzhen (CN); Chengjie Wang, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 425 days.

(21) Appl. No.: 17/739,053

(22) Filed: May 6, 2022

(65) Prior Publication Data
US 2022/0261965 A1     Aug. 18, 2022

Related U.S. Application Data

(63) Continuation of application No. PCT/CN2021/086576, filed on Apr. 12, 2021.

(30) Foreign Application Priority Data

May 18, 2020 (CN) .......................... 202010419181.7

(51) Int. Cl.
*G06T 5/00* (2024.01)
*G06N 20/20* (2019.01)
(Continued)

(52) U.S. Cl.
CPC ............. *G06T 5/00* (2013.01); *G06N 20/20* (2019.01); *G06T 5/50* (2013.01); *G06V 10/774* (2022.01); *G06T 2207/20081* (2013.01)

(58) Field of Classification Search
CPC ................ G06T 5/00; G06T 5/50; G06T 2207/20081; G06V 10/774
See application file for complete search history.

(56) References Cited

U.S. PATENT DOCUMENTS 11,315,222 B2*  4/2022  Lee ................. G06N 3/045
2011/0221966 A1*  9/2011  Hsieh ............... G06T 3/4053
                                                348/665
(Continued)

FOREIGN PATENT DOCUMENTS

CN    109389156 A    2/2019
CN    109961103 A    7/2019
(Continued)

OTHER PUBLICATIONS

X. Ji, Y. Cao, Y. Tai, C. Wang, J. Li and F. Huang, "Real-World Super-Resolution via Kernel Estimation and Noise Injection," 2020 IEEE/CVF Conference on Computer Vision and Pattern Recognition Workshops (CVPRW), Seattle, WA, USA, 2020, pp. 1914-1923, doi: 10.1109/CVPRW50498.2020.00241. (Year: 2020).*
(Continued)

*Primary Examiner* — Chan S Park
*Assistant Examiner* — Sebastian-Sy Vuchi Ngo
(74) *Attorney, Agent, or Firm* — ANOVA LAW GROUP, PLLC

(57) ABSTRACT

A method, an apparatus, and a device for image processing and a training method thereof are provided. The training method includes obtaining a sample image set, the sample image set comprising a first number of sample images; constructing an image feature set based on the sample image
(Continued)

set, the image feature set comprising an image feature extracted from each of the sample images in the sample image set; obtaining a training image set, the training image set comprising a second number of training images; constructing multiple training image pairs based on the training image set and the image feature set; and training the image processing model based on the multiple training image pairs.

20 Claims, 5 Drawing Sheets

(51) Int. Cl.
  *G06T 5/50* (2006.01)
  *G06V 10/774* (2022.01)

(56) References Cited

U.S. PATENT DOCUMENTS

| | | | |
|---|---|---|---|
| 2018/0005361 A1* | 1/2018 | Bulyshev | G06T 11/006 |
| 2018/0089803 A1* | 3/2018 | Zhang | G06N 3/08 |
| 2019/0213444 A1 | 7/2019 | Zheng et al. | |
| 2020/0402205 A1* | 12/2020 | Su | G06T 5/70 |
| 2021/0264205 A1 | 8/2021 | Ge et al. | |
| 2021/0281878 A1* | 9/2021 | Chan | G06N 20/00 |

FOREIGN PATENT DOCUMENTS

| | | | |
|---|---|---|---|
| CN | 110163082 A | 8/2019 | |
| CN | 110717864 A | 1/2020 | |
| CN | 111598808 A | 8/2020 | |
| WO | WO-2022182353 A1 * | 9/2022 | G06V 10/82 |

OTHER PUBLICATIONS

Eirikur Agustsson et al., "Ntire 2017 challenge on single image super-resolution: Dataset and study," in Proceedings of the IEEE Conference on Computer Vision and Pattern Recognition Workshops, pp. 126-135, 2017. 10 pages.
Simon Baker et al., "Limits on Super-Resolution and How to Break Them," in the Proceedings of the 2000 IEEE Conference on Computer Vision and Pattern Recognition, 2000. 8 pages.
Sefi Bell-Kligler et al., "Blind Super-Resolution Kernel Estimation using an Internal-GAN," arXiv:1909.06581v6, Jan. 7, 2020. 10 pages.
Jianrui Cai et al., "Toward Real-World Single Image Super-Resolution: A New Benchmark and A New Model," arXiv:1904.00523v1, Apr. 1, 2019. 20 pages.
Chang Chen et al., "Camera Lens Super-Resolution," arXiv:1904.03378v1, Apr. 6, 2019. 9 pages.
Tao Dai et al., "Second-order Attention Network for Single Image Super-Resolution," in Proceedings of the IEEE Conference on Computer Vision and Pattern Recognition, pp. 11065-11074, 2019. 10 pages.
Chao Dong et al., "Image Super-Resolution Using Deep Convolutional Networks," arXiv:1501.00092v3, Jul. 31, 2015. 14 pages.
Manuel Fritsche et al., "Frequency Separation for Real-World Super-Resolution," arXiv preprint arXiv:1911.07850v1, Nov. 18, 2019. 10 pages.
Wei Han et al., "Image Super-Resolution via Dual-State Recurrent Networks," arXiv:1805.02704v1, May 7, 2018. 10 pages.
Muhammad Haris et al., "Deep Back-Projection Networks for Super-Resolution," arXiv:1803.02735v1, Mar. 7, 2018. 10 pages.
Xiangyu He et al., "ODE-inspired Network Design for Single Image Super-Resolution," in Proceedings of the IEEE Conference on Computer Vision and Pattern Recognition, pp. 1732-1741, 2019. 10 pages.
Xuecai Hu et al., "Meta-SR: A Magnification-Arbitrary Network for Super-Resolution," arXiv:1903.00875v4, Apr. 3, 2019. 10 pages.

Andrey Ignatov et al., "DSLR-Quality Photos on Mobile Devices with Deep Convolutional Networks," in Proceedings of the IEEE International Conference on Computer Vision, pp. 3277-3285, 2017. 9 pages.
Phillip Isola et al., "Image-to-Image Translation with Conditional Adversarial Networks" arXiv:161.07004v3, Nov. 26, 2018. 17 pages.
Justin Johnson et al., "Perceptual Losses for Real-Time Style Transfer and Super-Resolution," arXiv:1603.08155v1, Mar. 27, 2016. 18 pages.
Jiwon Kim et al., "Accurate Image Super-Resolution Using Very Deep Convolutional Networks," arXiv:1511.04587v2, Nov. 11, 2016. 9 pages.
Wei-Sheng Lai et al., "Deep Laplacian Pyramid Networks for Fast and Accurate Super-Resolution," arXiv:1704.03915v2, Oct. 9, 2017. 9 pages.
Christian Ledig et al., "Photo-Realistic Single Image Super-Resolution Using a Generative Adversarial Network," arXiv:1609.04802v5, May 25, 2017. 19 pages.
Zhen Li et al., "Feedback Network for Image Super-Resolution," arXiv:1903.09814v2, Jun. 28, 2019. 15 pages.
Bee Lim et al., "Enhanced Deep Residual Networks for Single Image Super-Resolution," arXiv:1707.02921v1, Jul. 10, 2017. 9 pages.
Andreas Lugmayr et al., "Unsupervised Learning for Real-World Super-Resolution," arXiv:1909.09626v1, Sep. 20, 2019. 16 pages.
Andreas Lugmayr et al., "AIM 2019 Challenge on Real-World Image Super-Resolution: Methods and Results," arXiv:1911.07783v2, Nov. 19, 2019. 9 pages.
Andreas Lugmayr et al., "NTIRE 2020 Challenge on Real-World Image Super-Resolution: Methods and Results," arXiv:2005.01996v1, May 5, 2020. 19 pages.
Jinshan Pan et al., "Learning Dual Convolutional Neural Networks for Low-Level Vision," arXiv:1805.05020v1, May 14, 2018. 10 pages.
Yajun Qiu et al., "Embedded Block Residual Network: A Recursive Restoration Model for Single-Image Super-Resolution," in Proceedings of the IEEE International Conference on Computer Vision, pp. 4180-4189, 2019. 10 pages.
Assaf Shocher et al., ""Zero-Shot" Super-Resolution using Deep Internal Learning," arXiv:1712.06087v1, Dec. 17, 2017. 9 pages.
Karen Simonyan et al., "Very Deep Convolutional Networks for Large-Scale Image Recognition," arXiv preprint arXiv:1409.1556v6, Apr. 10, 2015. 14 pages.
Ying Tai et al., "MemNet: A Persistent Memory Network for Image Restoration," arXiv:1708.02209v1, Aug. 7, 2017. 9 pages.
Radu Timofte et al., "NTIRE 2017 Challenge on Single Image Super-Resolution: Methods and results," in Proceedings of the IEEE conference on computer vision and pattern recognition workshops, pp. 114-125, 2017. 12 pages.
Xintao Wang et al., "Recovering Realistic Texture in Image Super-resolution by Deep Spatial Feature Transform," arXiv:1804.02815v1, Apr. 9, 2018. 10 pages.
Xintao Wang et al., "ESRGAN: Enhanced Super-Resolution Generative Adversarial Networks," arXiv:1809.00219v2, Sep. 17, 2018. 23 pages.
Xiangyu Xu et al., "Towards Real Scene Super-Resolution with Raw Images," in Proceedings of the IEEE Conference on Computer Vision and Pattern Recognition, pp. 1723-1731, 2019. 9 pages.
Kai Zhang et al., "Deep Plug-and-Play Super-Resolution for Arbitrary Blur Kernels," arXiv:1903.12529v1, Mar. 29, 2019. 11 pages.
Richard Zhang et al., "The Unreasonable Effectiveness of Deep Features as a Perceptual Metric," arXiv:1801.03924v2, Apr. 10, 2018. 14 pages.
Wenlong Zhang et al., "RankSRGAN: Generative Adversarial Networks with Ranker for Image Super-Resolution," arXiv:1908.06382v2, Aug. 26, 2019. 18 pages.
Xuaner Zhang et al., "Zoom to Learn, Learn to Zoom," arXiv:1905.05169v1, May 13, 2019. 9 pages.
Yulun Zhang et al., "Image Super-Resolution Using Very Deep Residual Channel Attention Networks," arXiv:1807.02758v2, Jul. 12, 2018. 16 pages.

(56) References Cited

OTHER PUBLICATIONS

Zhifei Zhang et al., "Image Super-Resolution by Neural Texture Transfer," in Proceedings of the IEEE Conference on Computer Vision and Pattern Recognition, pp. 7982-7991, 2019. 10 Pages.

Haitian Zheng et al., "CrossNet: An End-to-end Reference-based Super Resolution Network using Cross-scale Warping," arXiv:1807.10547v1, Jul. 27, 2018. 17 pages.

Ruofan Zhou et al., "Kernel Modeling Super-Resolution on Real Low-Resolution Images," in Proceedings of the IEEE International Conference on Computer Vision, pp. 2433-2443, 2019. 11 pages.

Jun-Yan Zhu et al., "Unpaired Image-to-Image Translation using Cycle-Consistent Adversarial Networks," arXiv:1703.10593v7, Aug. 24, 2020. 18 pages.

The World Intellectual Property Organization (WIPO) International Search Report for PCT/CN2021/086576 Jul. 2, 2021 5 Pages (including translation).

\* cited by examiner

Input image 101

Output image 103

Original low-resolution image    EDSR   ESRGAN   ZSSR   K-ZSSR   This application

TRAINING METHOD OF IMAGE PROCESSING MODEL, IMAGE PROCESSING METHOD, APPARATUS, AND DEVICE

RELATED APPLICATIONS

This application is a continuation application of PCT Application No. PCT/CN2021/086576, filed on Apr. 12, 2021, which in turn claims priority to Chinese Patent Application No. 202010419181.7, entitled "METHOD, APPARATUS, AND DEVICE FOR IMAGE PROCESSING AND TRAINING METHOD THEREOF" filed with the China National Intellectual Property Administration on May 18, 2020. The two applications are incorporated herein by reference in their entirety.

FIELD OF THE TECHNOLOGY

This application relates to the field of image processing technologies, and more specifically, to a method, an apparatus, and a device for image processing and a training method thereof.

BACKGROUND OF THE DISCLOSURE

Image degradation is the deterioration of the quality of an image during formation, recording, processing, and transmission of the image due to imperfections of the imaging system, recording device, transmission medium, and processing method. An image often degrades in an unknown manner in the real world, so it is necessary to correctly estimate the image degradation so that the original high-resolution image can be restored. The process of upscaling a low-resolution image to a high-resolution image by using an image processing algorithm or a neural network is referred to a super-resolution process. However, current super-resolution algorithms train the neural network based on clean and sharp training images. According to these methods, high-resolution images are downscaled by using bicubic operators to obtain low-resolution images. The high-resolution and low-resolution images are then paired to form training images used for training a neural network capable of processing clean and sharp images. However, the low-resolution images constructed by using the bicubic operators are different from low-resolution images in a real image degradation scenario with the noise or blurriness features. Therefore, the current super-resolution algorithms work stably on ideal clean image data, but are less effective in processing real images with certain noise and blurriness. The current super-resolution algorithms still have the following shortcomings: (1) using specific bicubic operators to construct training data does not reflect the real degradation process of images; (2) only the resolution is increased, but the blurriness/noise issue in low-resolution images remains unsolved; (3) the generated high-resolution images do not have sufficient texture details for reconstructing realistic texture information.

Therefore, a novel training method of an image processing model is needed. The training method would not require any paired training images, and would use only unlabeled real images as the training input, so that the trained neural network can resolve the blurriness/noise issue in the low-resolution images to generate sharper/cleaner high-resolution images.

SUMMARY

An embodiment of this application provides a training method of an image processing model, performed by an image processing device, including obtaining a sample image set, the sample image set comprising a first number of sample images; constructing an image feature set based on the sample image set, the image feature set comprising an image feature extracted from each of the sample images in the sample image set; obtaining a training image set, the training image set comprising a second number of training images; constructing multiple training image pairs based on the training image set and the image feature set; and training the image processing model based on the multiple training image pairs.

An embodiment of this application provides an image processing method, performed by an image processing device, including obtaining an input image to be processed; performing image processing on the input image based on a trained image processing model to generate a processed output image; and outputting the processed output image, a resolution of the output image being higher than a resolution of the input image. The trained image processing model being trained according to a training method including obtaining a sample image set, the sample image set comprising a first number of sample images; constructing an image feature set based on the sample image set, the image feature set comprising an image feature extracted from each of the sample images in the sample image set; obtaining a training image set, the training image set comprising a second number of training images; constructing multiple training image pairs based on the training image set and the image feature set; and training the image processing model based on the multiple training image pairs.

An embodiment of this application provides an image processing device, including: a processor; and a memory, storing computer-executable instructions, the instructions, when executed by the processor, implementing any one of the foregoing methods.

An embodiment of this application provides a non-transitory computer-readable storage medium, storing computer-executable instructions, the instructions, when executed by a processor, implementing one of the foregoing methods.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
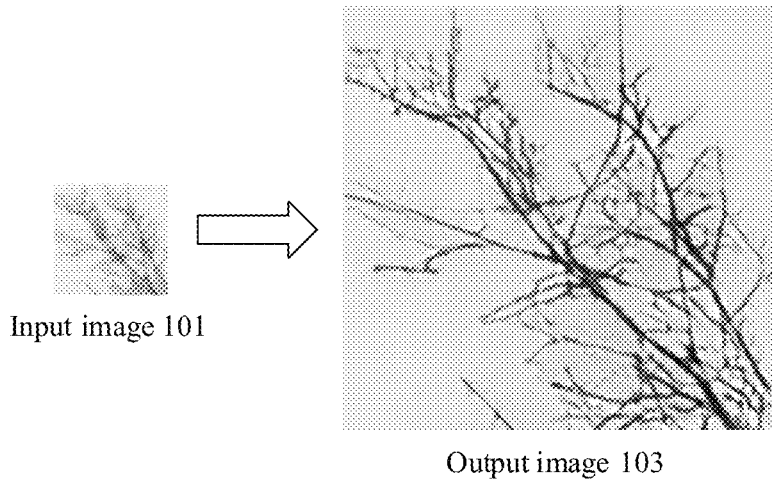
FIG. 1 shows a schematic process of super-resolution processing in an image processing system according to an embodiment of this application.

To make the objectives, technical solutions, and advantages of this application clearer, the following describes the exemplary embodiments of this application in detail with reference to the accompanying drawings. Apparently, the described embodiments are merely some but not all of the embodiments of this application. It should be understood that, this application is not limited by the exemplary embodiments described herein.

In this specification and the accompanying drawings, steps and elements with substantially the same or similar characteristics are indicated by the same or similar reference numerals, and repetitive descriptions of such steps and elements will be omitted. In addition, in the descriptions of this application, the terms such as "first" and "second" are intended to distinguish the descriptions only, and shall not be understood as indicating or implying relative importance or a sequence.

In this specification and the accompanying drawings, elements are described in the singular or plural form according to the embodiments. However, the singular and plural forms are appropriately selected to be used in the described circumstances merely for ease of interpretation and are not intended to limit this application thereto. Therefore, the singular form includes the plural form, and the plural form also includes the singular form, unless the context clearly indicates otherwise.

Embodiments of this application relate to denoising, deblurring, and super-resolution processing on images by using a neural network. For ease of understanding, some concepts related to this application are first introduced below.

Real image: an original image before processing such as denoising, deblurring, super-resolution, and the like. For example, a real image may be the original image actually captured by a camera, a smartphone, or another device.

Image degradation: the deterioration of the quality of an image during formation, recording, processing, and transmission of the image due to imperfections of the imaging system, recording device, transmission medium, and processing method. An image often degrades in an unknown manner in the real world, so it is necessary to correctly estimate the image degradation so that an original high-resolution image can be restored.

Image denoising/deblurring: the process of reconstructing a clean/sharp image based on a noisy/blurred image by using an image processing algorithm or a neural network.

Super-resolution: the process of upscaling a low-resolution image to a high-resolution image by using an image processing algorithm or a neural network.

Neural network: a network structure that uses a constructed computing process to operate on input data and can be trained to fit specific data. In embodiments of this application, a trained neural network can be used to process an inputted low-resolution image to generate a high-resolution output image.

With reference to the accompanying drawings, the following further describes the embodiments of this application.

FIG. 1 shows a schematic process 100 of super-resolution processing in an image processing system according to an embodiment of this application.

In the super-resolution processing scenario shown in FIG. 1, an input image 101 may be an inputted low-resolution image, for example, the input image 101 may be a low-resolution image captured by a low-resolution camera or smartphone, a compressed low-resolution image, or a low-resolution image obtained via a network or from a specific memory. An image processing system (not shown), for example, may perform super-resolution processing on the input image 101 to generate an output image with higher resolution (for example, the resolution of an output image 103 is four times higher). In an embodiment, the image processing system may further perform denoising and/or deblurring processing on the low-resolution input image 101 to generate an output image with lower level of noise and/or blurriness (that is, cleaner and/or sharper). In an embodiment, the image processing system may be implemented by using a pre-trained neural network. In another embodiment, the image processing system may further be implemented by using any other image processing algorithm capable of implementing super-resolution, denoising, and/or deblurring functions.

A number of super-resolution algorithms train the neural network based on clean and sharp training images. According to these methods, high-resolution images are downscaled by using bicubic operators to obtain low-resolution images. The high-resolution and low-resolution images are then paired to form training images used for training a neural network to clean and sharpen images. However, the low-resolution images constructed by using the bicubic operators are different from a low-resolution image in a real image degradation scenario with the noise or blurriness feature. Therefore, the current super-resolution algorithms work well on ideal clean and sharp image data, but are less effective in processing real images with certain noise and blurriness. The current super-resolution algorithms also have the following shortcomings: (1) using specific bicubic operators to construct training data does not reflect the real degradation process of images; (2) only the resolution is increased, but the blurriness/noise issue in low-resolution images remains unsolved; (3) the generated high-resolution images do not have sufficient texture details for reconstructing realistic texture information.

Therefore, a novel training method of an image processing model is needed. This type of training method does not require any paired training images, and uses only unlabeled real images (that is, captured actual images) as the training input, so that the trained neural network can resolve the blurriness/noise issue in the low-resolution images to generate sharper/cleaner high-resolution images.

Figure 2:
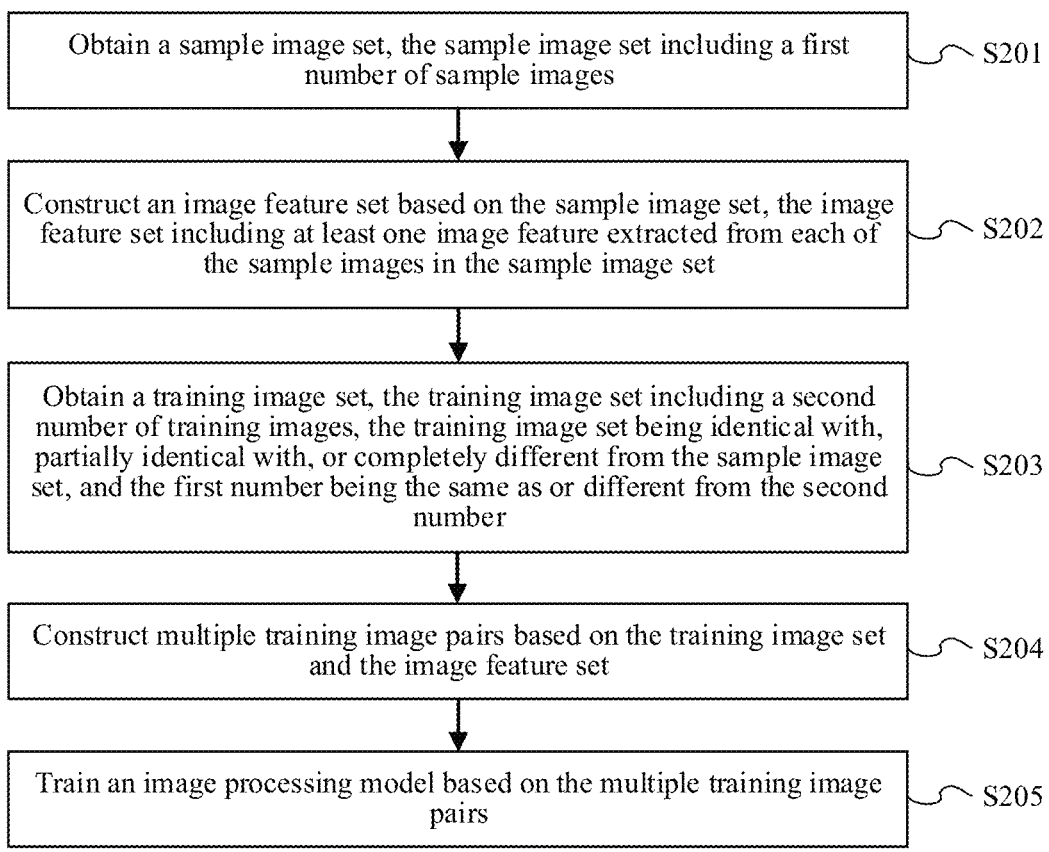
FIG. 2 is a flowchart of a training method of an image processing model according to an embodiment of this application.
Figure 3:
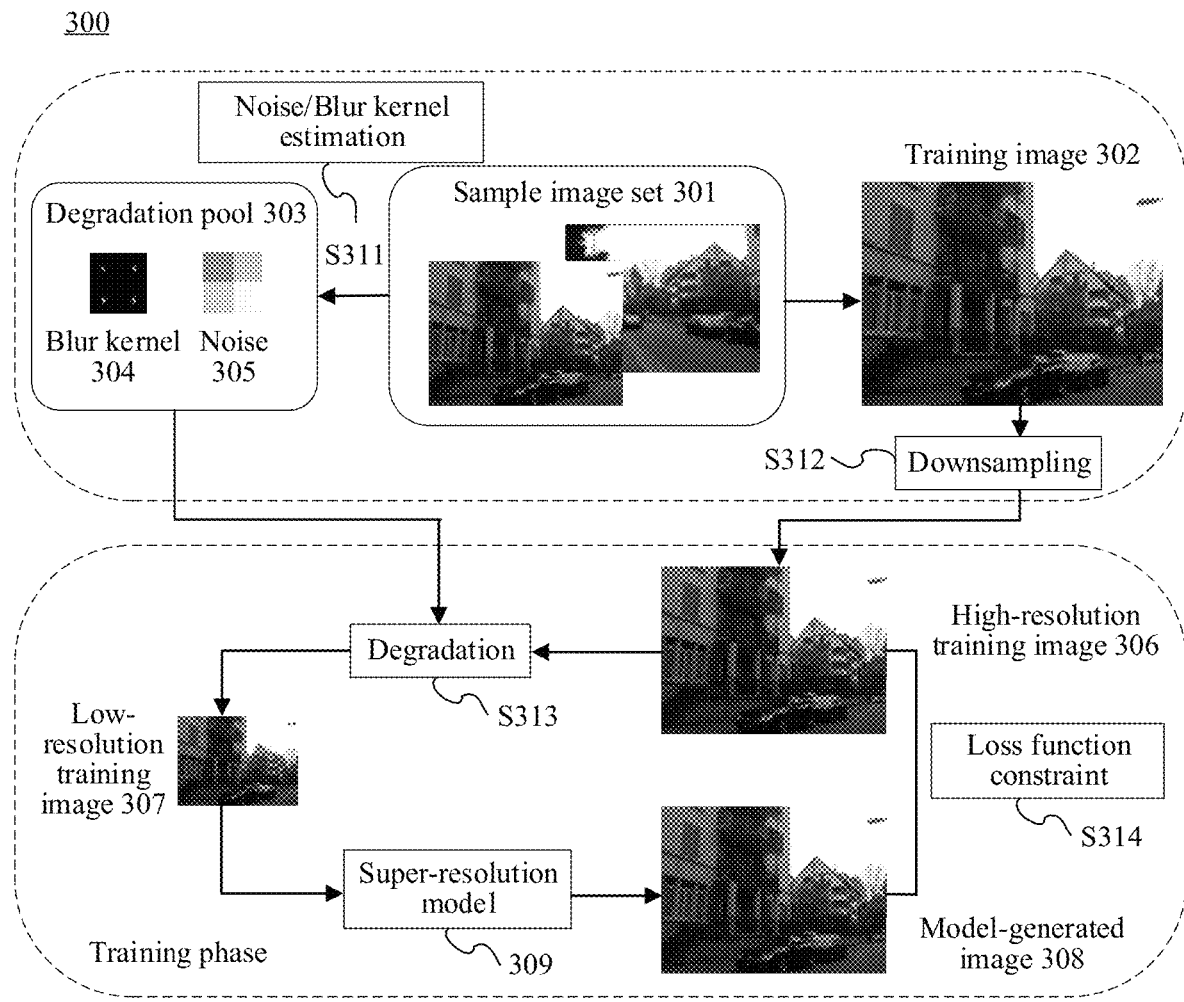
FIG. 3 is a schematic diagram of a training process of an image processing model according to an embodiment of this application.

With reference to FIG. 2 and FIG. 3, the following describes a training method and a training process of an image processing model according to an embodiment of this application.

Specifically, FIG. 2 is a flowchart of a training method 200 of the image processing model according to an embodiment of this application, and FIG. 3 shows a training process 300 of the image processing model according to an embodiment of this application.

As shown in FIG. 2, the training method 200 of the image processing model may be performed by an image processing device, and includes steps S201 to S205. First, in step S201, the image processing device obtains a sample image set, the sample image set including a first number of sample images.

In an embodiment, as shown in FIG. 3, a sample image set 301 may include multiple sample images, where each of the sample images may be any image that contains the noise and blurriness information of a real image. For example, the sample image may be a low-resolution image (that is, the real image) captured by a low-resolution camera or smartphone, a compressed image, an image obtained via network transmission, or any other image that is degraded from a real image during formation, recording, processing, and transmission.

Next, in step S202, the image processing device constructs an image feature set based on the sample image set, the image feature set including at least one image feature extracted from each of the sample images in the sample image set. The at least one image feature may include a blurriness feature and a noise feature.

Specifically, in an embodiment, the blurriness feature and the noise feature can be extracted from each of the sample images in the sample image set, and the image feature set can be constructed based on the blurriness feature and the noise feature of each of the sample images. For example, in an embodiment, as shown in FIG. 3, any blur kernel estimation algorithm and any image noise estimation algorithm may be used in step S311 to estimate a blur kernel 304 and a noise 305 of each of the sample images, and each estimated blur kernel 304 and noise 305 may be added into a degradation pool 303.

Next, in step S203, the image processing device obtains a training image set, the training image set including a second number of training images, the training image set being identical with, partially identical with, or completely different from the sample image set, and the first number being the same as or different from the second number.

In an embodiment, the training image set may be an image set identical with the sample image set 301. In another embodiment, the training image set may also be an image set completely different from the sample image set 301. For example, the training image set may be an image set consisting of multiple other high-resolution and/or clean and/or sharp images that are completely different from the sample images in the sample image set 301, and the number of the training images in the training image set may be the same as or different from the number of the sample images in the sample image set 301. In other embodiments, the training image set may also be partially identical with the sample image set 301, and the number of the training images in the training image set may be the same as or different from the number of the sample images in the sample image set 301.

Next, in step S204, the image processing device constructs multiple training image pairs based on the training image set and the image feature set.

In an embodiment, each training image pair may include one training target image and one training input image (for example, as shown in FIG. 3, the training target image is a high-resolution training image 306, and the training input image is a low-resolution training image 307), a resolution of the training input image being lower than a resolution of the training target image. The high-resolution training image 306 and the low-resolution training image 307 are relative to each other, and a resolution of the high-resolution training image 306 is higher than a resolution of the low-resolution training image 307. The constructing multiple training image pairs based on the training image set and the image feature set may include: for each (for example, a training image 302) of at least a part of the training images in the training image set, performing image enhancement on the training image to obtain the training target image; and obtaining the training input image corresponding to the training target image based on the training target image and the image feature set. The resolution of the training target image (the high-resolution training image 306) may be equal to or lower than a resolution of the training image, and the resolution of the training input image (the low-resolution training image 307) may be lower than the resolution of the training image and the resolution of the training target image.

Specifically, FIG. 3 shows an embodiment in which the training image 302 is from the sample image set 301 (that is, the training image set is partially identical with or identical with the sample image set 301). In such an embodiment, as shown in FIG. 3, downsampling may be performed on the training image 302 in step S312 to obtain the training target image (for example, the high-resolution training image 306). A resolution of the high-resolution training image 306 obtained through the downsampling may be lower than a resolution of the training image 302. In addition to the downsampling, in an embodiment, denoising and/or deblurring (not shown) may be performed on the training image 302 in step S312 to obtain the high-resolution training image 306 with a resolution lower than the resolution of the training image 302, and/or with noise and/or blurriness lower than noise and/or blurriness of the training image 302. In an embodiment, bicubic interpolation downsampling may be performed on the training image 302 to obtain the high-resolution training image 306 with a lower resolution and lower noise and blurriness. In this case, a process of the example can be represented by equation (1) below.

$$I_{HR}=(I_{src}*k_{bicubic})\downarrow_{sc} \quad (1)$$

where $I_{HR}$ denotes the training target image (for example, the high-resolution training image 306), $I_{src}$ denotes the training image 302, $k_{bicubic}$ denotes an ideal bicubic kernel, $\downarrow_{sc}$ denotes downsampling with sc as a scale factor, and * denotes a cross-correlation operation.

In an embodiment, the obtaining the training input image corresponding to the training target image based on the training target image and the image feature set may include: selecting at least one image feature from the image feature set; applying the selected at least one image feature to the training target image; and performing downsampling on the training target image to obtain the training input image, the resolution of the training input image being lower than the resolution of the training target image. In some embodiments, the at least one image feature may be selected from the image feature set randomly, or may be selected from the image feature set according to a specific probability distribution. The at least one image feature may be applied to the training target image first, and then the downsampling may be performed on the training target image; additionally, or alternatively, the downsampling may also be performed on the training target image first and then the at least one image feature may be applied to the downsampled training target image.

Specifically, as shown in FIG. 3, the training target image (for example, the high-resolution training image 306) may be degraded in step S313 to obtain the corresponding training input image (for example, the low-resolution training image 307). The at least one image feature may include at least one blurriness feature and at least one noise feature. For example, the at least one blurriness feature and the at least one noise feature may be selected from the image feature set; the selected at least one blurriness feature may be applied to the training target image to obtain a first training intermediate image with the blurriness added therein; the downsampling may be performed on the first training intermediate image with the blurriness added therein to obtain a downsampled second training intermediate image; and, the selected at least one noise feature may be applied to the downsampled second training intermediate image to obtain the training input image.

Specifically, in an embodiment, first, a pre-estimated blur kernel 304 may be selected from the degradation pool 303 and is used in the cross-correlation (or a convolution) operation with the training target image (for example, the high-resolution training image 306), and then downsampling with a step of s may be performed to obtain a degraded image (not shown) after blurring and downsampling, as shown in equation (2) below.

$$I_D = (I_{HR} * k_i) \downarrow_s, \ i \in \{1, 2, \ldots, m\} \qquad (2)$$

where $I_D$ denotes the degraded image, $I_{HR}$ denotes the training target image (for example, the high-resolution training image 306), m denotes the total number of pre-estimated blur kernels 304 in the degradation pool 303, $k_i$ denotes the specific blur kernel selected from the degradation pool 303, $\downarrow_s$ denotes the downsampling with a step of s, and * denotes the cross-correlation operation.

In an embodiment, the downsampling with a step of s may be different from the bicubic downsampling described above, and may be a sample extraction simply at an interval of s pixels. Such downsampling may not affect a blurriness feature of an image. In an embodiment, at least one blur kernel may be applied to the training target image $I_{HR}$.

In an embodiment, a pre-estimated noise 305 may also be selected from the degradation pool 303 and be added into the degraded image to obtain the training input image (for example, the low-resolution training image 307), as shown in equation (3) below.

$$I_{LR} = I_D + n_i, \ i \in \{1, 2, \ldots, l\} \qquad (3)$$

where $I_{LR}$ denotes the training input image (for example, the low-resolution training image 307), $I_D$ denotes the degraded image obtained from equation (2), l denotes the total number of pre-estimated noises 305 obtained from the degradation pool 303, and $n_i$ denotes the specific noise selected from the degradation pool 303. The size of $n_i$ may be determined according to the size of the degraded image $I_D$. In an embodiment, the at least one noise may be added into the degraded image $I_D$.

After the foregoing steps, multiple training image pairs for training the image processing model according to an embodiment of this application may be obtained, where the obtained training input image may contain image features such as the blurriness feature and the noise feature of the image degraded from the real image.

Next, in step S205, the image processing device trains the image processing model based on the multiple training image pairs.

As described above, the image processing model may include a trained neural network model (for example, a trained super-resolution model 309) that can perform image super-resolution processing. In an embodiment, training the neural network model based on the multiple training image pairs may include: using, for each training image pair of the multiple training image pairs, the training input image in the training image pair as an input to the neural network model; calculating a loss function of the neural network model based on an output of the neural network model and the training target image in the training image pair; and optimizing a network parameter of the neural network model based on the loss function.

Specifically, as shown in FIG. 3, the training input image in the training image pair, for example the low-resolution training image 307 (or a region of a specific size cropped from the low-resolution training image 307), may be inputted into the super-resolution model 309 to be trained, and the super-resolution model 309 may output a model-generated image 308. In an embodiment, as shown in FIG. 3, the loss function of the super-resolution model 309 may be calculated in step S314 based on the model-generated image 308 and the training target image (for example, the high-resolution training image 306) in the corresponding training image pair, and the network parameter of the super-resolution model 309 may be optimized based on the loss function.

In an embodiment, calculating the loss function of the super-resolution model 309 may include calculating a reconstruction loss $L_p$, where the reconstruction loss $L_p$ may be an L1 norm distance or an L2 norm distance between a pixel value of the model-generated image 308 output by the super-resolution model 309 and a pixel value of the training target image (for example, the high-resolution training image 306). For example, the L1 norm distance may be a distance, calculated according to the Manhattan norm, between the pixel value of the model-generated image 308 and the pixel value of the training target image (for example, the high-resolution training image 306), and the L2 norm distance may be a Euclidean distance between the pixel value of the model-generated image 308 and the pixel value of the training target image (for example, the high-resolution training image 306). The reconstruction loss $L_p$ may be used to enhance the fidelity of the generated image.

In addition, in an embodiment, the calculating the loss function of the super-resolution model 309 may include calculating a perception loss $L_f$, where the perception loss $L_f$ may be an L1 norm distance or an L2 norm distance between a low-frequency image feature (for example, an image edge feature) of the model-generated image 308 output by the super-resolution model 309 and a low-frequency image feature of the training target image (for example, the high-resolution training image 306). For example, the L1 distance may be a distance, calculated according to a Manhattan norm, between the low-frequency image feature of the model-generated image 308 and the low-frequency image feature of the training target image (for example, the high-resolution training image 306), and the L2 distance may be a Euclidean distance between the low-frequency image feature of the model-generated image 308 and the low-frequency image feature of the training target image (for example, the high-resolution training image 306). In an embodiment, the low-frequency image feature may be extracted by a pre-trained feature extracting network (for example, a VGG-19 network) (not shown) capable of extracting low-frequency features (for example, an image edge feature and the like) from images. The perception loss $L_f$ may be used to enhance the visual effect of the low-frequency feature (for example, an image edge and the like) of the generated image.

In addition, in an embodiment, the super-resolution model 309 and another discriminator network (not shown) may form a generative adversarial network, and the calculating the loss function of the super-resolution model 309 may include calculating an adversarial loss $L_d$, where the adversarial loss $L_d$ may be a discriminative output value after the model-generated image 308 output by the super-resolution model 309 is discriminated by the discriminator network. For example, the adversarial loss may be any value in a continuous interval [0, 1], representing the probability that the discriminator network will identify the model-generated image 308 as a true image (that is, not an image generated by a network model). The adversarial loss $L_d$ may be used to enhance details such as texture of the generated image.

In an embodiment, the loss function may be a weighted sum of the reconstruction loss $L_p$, the perception loss $L_f$ and the adversarial loss $L_d$, as shown in equation (4) below.

$$L_{total} = \lambda_p \cdot L_p + \lambda_f \cdot L_f + \lambda_d \cdot L_d \qquad (4)$$

where $L_{total}$ is a total loss function, and $\lambda_p$, $\lambda_f$ and $\lambda_d$ are the weights of the reconstruction loss $L_p$, the perception loss $L_f$ and the adversarial loss $L_d$ respectively. In an embodiment, $\lambda_p$, $\lambda_f$ and $\lambda_d$ may be set to 0.01, 1, and 0.005 respectively. In an embodiment, adjusting the weights $\lambda_p$, $\lambda_f$ and $\lambda_d$ may further achieve different training effects. For example, a network model capable of generating stronger texture details may be trained by increasing the weight of the adversarial loss $L_d$. Any other loss function may also be used to train the super-resolution model 309.

Based on the foregoing training method, a gradient may be passed back to the network layer by layer by using, for example, a backpropagation algorithm, to optimize the network parameter and continuously improve the performance of the super-resolution model 309.

In an embodiment, the super-resolution model 309 may be trained by using the multiple training images and repeatedly performing the training method until the super-resolution model 309 achieves desired processing performance. In an embodiment, whether the desired processing performance of the super-resolution model 309 is achieved can be determined by determining whether the loss function reaches a predetermined threshold. In another embodiment, the trained super-resolution model 309 may also be tested and analyzed in a test phase as shown in FIG. 4 to determine whether the desired processing performance of the super-resolution model 309 is achieved.

The training method of an image processing model according to an embodiment of this application does not require any paired training images as a training input, but can use unlabeled real images as the training input, and constructing training image pairs based on real images may retain features such as noise and blurriness of the real images or images degraded from the real images, so that the image processing model trained by using the training method of an embodiment of this application can resolve the blurriness and/or noise issue in the low-resolution images to generate sharper and/or cleaner high-resolution images.

Figure 4:
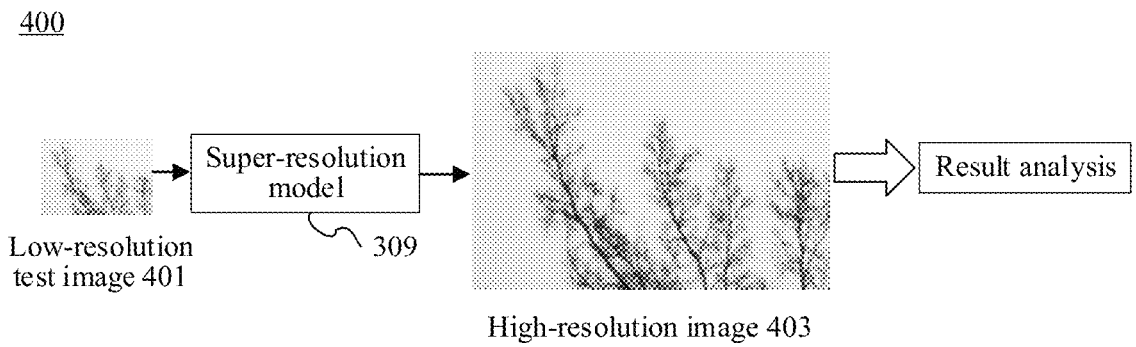
FIG. 4 is a schematic diagram of a testing process of an image processing model according to an embodiment of this application.

Specifically, FIG. 4 shows a testing process 400 of an image processing model according to an embodiment of this application. As shown in FIG. 4, one or more low-resolution test images 401 may be obtained as a test input, for example, the low-resolution test image 401 may be a low-resolution image captured by a low-resolution camera or smartphone, a compressed image, an image obtained via network transmission, or any other image that is degraded from a real image during formation, recording, processing, and transmission. The one or more low-resolution test images 401 can be inputted to the trained super-resolution model 309, and then the output one or more high-resolution images 403 are analyzed to determine, based on a result of the analysis, whether the desired processing performance of the super-resolution model 309 is achieved. For example, whether the noise level or the blurriness level of the high-resolution image 403 output by the model is reduced to a predetermined threshold can be analyzed, or whether the high-resolution image 403 output by the model is clean and sharp can be analyzed visually.

Figure 5:
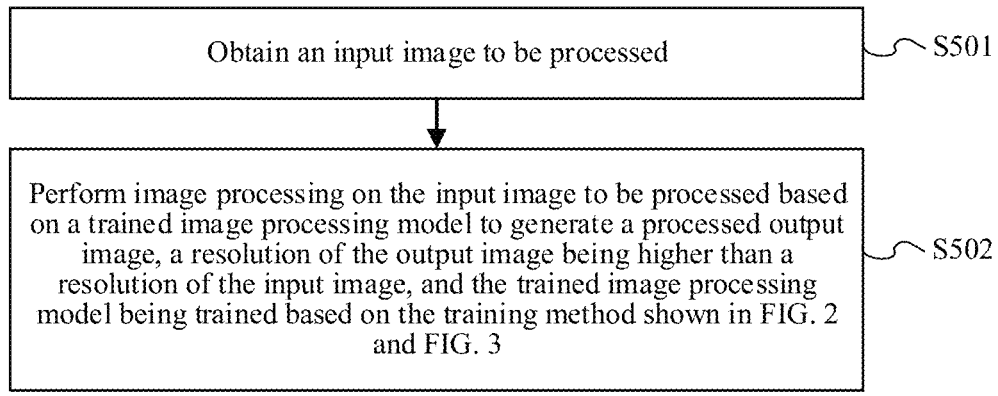
FIG. 5 is a flowchart of an image processing method based on the training method shown in FIG. 2 and FIG. 3 according to an embodiment of this application.

FIG. 5 is a flowchart of an image processing method 500 based on the training method shown in FIG. 2 and FIG. 3 according to an embodiment of this application.

As shown in FIG. 5, the image processing method 500 according to an embodiment of this application may be performed by an image processing device, and includes steps S501 and S502. In step S501, obtain an input image to be processed; and in step S502, perform image processing on the input image based on a trained image processing model to generate a processed output image, a resolution of the output image being higher than a resolution of the input image, and the trained image processing model being trained based on the training method shown in FIG. 2 and FIG. 3. The image processing method 500 may further include: outputting the processed output image.

In an embodiment, when input data to be processed is video data, the image processing method 500 according to an embodiment of this application may further include: performing frame extraction on the input video data to obtain multiple input images; performing the image processing on the multiple input images based on the trained image processing model to generate multiple processed output images; and synthesizing the multiple processed output images into output video data. In this way, super-resolution processing on video data is achieved.

In an embodiment, the image processing method according to an embodiment of this application may be used in an image inpainting scenario (for example, inpainting of a low-quality image). The image processing method according to an embodiment of this application may, based on a low-resolution image provided by a user, analyze the blurriness/noise in the low-resolution image and restore a high-quality sharp image. Compared with manual restoration, the image processing method according to the embodiment of this application is less costly and more efficient, and can reconstruct detailed information of an image while ensuring high fidelity by taking advantage of the memory of the neural network.

In an embodiment, the image processing method according to an embodiment of this application may further be used in transmission and restoration scenarios with a lossy compression image. For example, a high-resolution image takes up a large data space, so it may not be transmitted quickly over the Internet. However, a transmission method based on lossy compression may cause loss of image information. With the image processing method according to an embodiment of this application, the original detailed information in an image transmitted after the lossy compression can be restored as much as possible.

Figure 6:
FIG. 6 is a schematic diagram illustrating the comparison of processing effects of an image processing method according to an embodiment of this application.

FIG. 6 shows the comparison of processing effects of an image processing method according to an embodiment of this application.

Specifically, FIG. 6 shows the comparison of processing effects between the image processing method according to an embodiment of this application and the methods based on Enhanced Deep Residual Networks for Single Image Super-Resolution (EDSR), Enhanced Super-Resolution Generative Adversarial Networks (ESRGAN), "Zero-Shot" Super-Resolution (ZSSR), and "Zero-Shot" Super-Resolution Based on Kernel Estimation (K-ZSSR).

As shown in FIG. 6, the first column on the left is an inputted original low-resolution image, and the second to sixth columns are the image processing results based on the EDSR, ESRGAN, ZSSR, K-ZSSR, and image processing method according to an embodiment of this application respectively. The recovery result of the tree branch in FIG. 6 shows that the processing result by the image processing method according to an embodiment of this application is sharper; the recovery result of the wall and the text in FIG. 6 shows that the high-resolution image generated by the image processing method according to an embodiment of this application is cleaner and almost noiseless; and the recovery result of the window and the fence in FIG. 6 shows that the image processing method according to an embodiment of this application correctly retains important information such as the details in the original image. The generation results of the image processing method according to an embodiment of this application outperform those of the existing super-resolution processing methods in terms of sharpness, denoising, and detailed textures. In addition, the training method of the image processing model and the image processing method according to the embodiments of this application do not have any pre-processing and post-processing phases, making the testing process simpler and the processing speed more advantageous.

Figure 7:
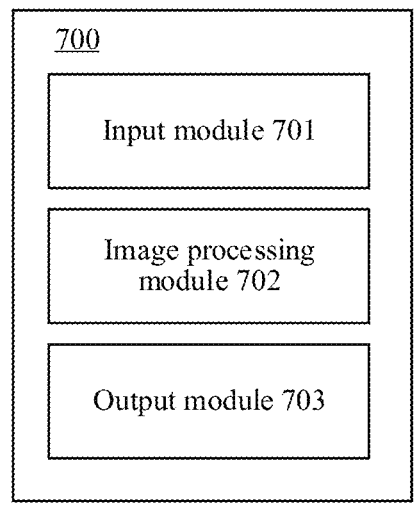
FIG. 7 is a schematic diagram of an image processing apparatus according to an embodiment of this application.

FIG. 7 is a schematic diagram of an image processing apparatus 700 according to an embodiment of this application.

As shown in FIG. 7, the image processing apparatus 700 according to an embodiment of this application may include: an input module 701, an image processing module 702, and an output module 703. The input module 701 is configured to obtain an input image to be processed; the image processing module 702 is configured to perform image processing on the input image based on a trained image processing model to generate a processed output image; and the output module 703 is configured to output the processed output image; where a resolution of the output image may be higher than a resolution of the input image, and the trained image processing model may be trained according to the training method according to an embodiment of this application.

According to an embodiment of this application, the apparatus may further include: a frame extraction module, configured to, when an input to be processed is video data, perform frame extraction on the video data to obtain multiple input images; and a frame synthesis module, configured to synthesize multiple processed output images into output video data. According to an embodiment of this application, the image processing module 702 is further configured to perform the image processing on the multiple input images based on the trained image processing model to generate the multiple processed output images; and the output module 703 is further configured to output the output video data.

Figure 8:
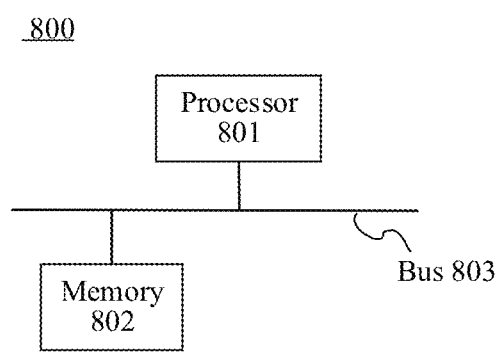
FIG. 8 is a schematic diagram of an image processing device according to an embodiment of this application.

FIG. 8 is a schematic diagram of an image processing device 800 according to an embodiment of this application.

As shown in FIG. 8, the image processing device 800 according to an embodiment of this application may include a processor 801 and a memory 802, where the processor 801 and the memory 802 may be interconnected via a bus 803. In this embodiment of this application, the image processing device 800 may be a server, a personal computer, or an intelligent terminal.

The processor 801 can perform various actions and processing according to a program or code stored in the memory 802. Specifically, the processor 801 may be an integrated circuit chip, and has a signal processing capability. The processor may be a general-purpose processor, a digital signal processor (DSP), an application-specific integrated circuit (ASIC), a field programmable gate array (FPGA) or any other programmable logic device, a discrete gate or a transistor logic device, or a discrete hardware component, implementing or performing the various methods, steps, processes, and logical block diagrams disclosed in the embodiments of this application. The general-purpose processor may be a microprocessor, or the processor may be any conventional processor and the like, or may be an X86 architecture or an ARM architecture and the like.

The memory 802 stores executable instructions, the instructions, when executed by the processor 801, implementing the training method of an image processing model and the image processing method according to the embodiments of this application. The memory 802 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus random access memory (DR RAM). The memory described herein aims to include but is not limited to these memories and any other suitable types of memories.

This application further provides a computer-readable storage medium, storing computer-executable instructions, the computer instructions, when executed by a processor, implementing the training method of an image processing model and the image processing method according to the embodiments of this application. Similarly, the computer-readable storage medium in the embodiments of this application may be a volatile memory or a non-volatile memory, or may include both a volatile memory and a non-volatile memory. The memory for the method described herein aims to include but is not limited to these memories and any other suitable types of memories.

The embodiments of this application provide a method, an apparatus, and a device for image processing and a training method thereof. The training method has no specific priori knowledge requirements for training images and degradation manners, and is capable of analyzing the blurriness/noise issue existing in the image; a constructed degradation pool is used to obtain images with different degrees of degradation, so as to be capable of processing low-resolution images containing multiple blurriness/noise issues; a loss function is adjusted to control the richness of texture information of generated images so as to meet image processing needs in different scenarios; and the images, generated according to the image processing method provided by the embodiments of this application, have fewer artifacts and pseudo images and can retain more important information in the low-resolution images.

The flowcharts and block diagrams in the accompanying drawings illustrate possible system architectures, functions, and operations that may be implemented by the system, method, and computer program product according to various embodiments of this application. In this regard, each box in a flowchart or a block diagram may represent a module, a program segment, or a part of code. The module, the program segment, or the part of code includes at least one executable instruction used for implementing designated logic functions. In some embodiments, functions described in boxes may alternatively occur in a sequence different from what were described in an accompanying drawing. For example, two steps described in boxes shown in succession may be performed in parallel, and sometimes the steps in two boxes may be performed in a reverse sequence. This is determined by a related function. Each box in a block diagram and/or a flowchart, and a combination of boxes in the block diagram and/or the flowchart, may be implemented with a dedicated hardware-based system that performs specified functions or operations, or may be implemented with a combination of dedicated hardware and computer instructions.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software.

In general, various embodiments of this application can be implemented in hardware or a dedicated circuit, software, firmware, logic, or any combination thereof. Some aspects can be implemented in hardware, while other aspects can be implemented in firmware or software executable by a controller, a microprocessor, or other computing devices. When various aspects of the embodiments of this application are illustrated or described as block diagrams, flowcharts, or represented by some other graphs, the blocks, apparatuses, systems, technologies, or methods described herein can be implemented, as non-restrictive examples, in hardware, software, firmware, a dedicated circuit or logic, general-purpose hardware or a controller or other computing devices, or some combinations thereof.

The embodiments of this application described in detail are merely illustrative and are not limitative. A person skilled in the art should understand that various modifications and combinations may be made to these embodiments or the features thereof without departing from the principles and spirit of this application, and such modifications shall fall within the scope of this application.

What is claimed is:

1. An image processing method, performed by an image processing device, comprising:
obtaining a sample image set, the sample image set comprising a first number of sample images;
constructing an image feature set based on the sample image set, the image feature set comprising an image feature extracted from each of the sample images in the sample image set, and the image feature comprises a blurriness feature and a noise feature;
obtaining a training image set, the training image set comprising a second number of training images;
constructing multiple training image pairs based on the training image set and the image feature set, each of the training image pairs comprising a training target image and a training input image, comprising: obtaining the training input image corresponding to the training target image based on the training target image and the image feature set, a resolution of the training target image being higher than a resolution of the training input image; and
training an image processing model based on the multiple training image pairs.

2. The method according to claim 1, wherein the constructing an image feature set based on the sample image set comprises:
extracting the blurriness feature and the noise feature of each of the sample images in the sample image set; and
constructing the image feature set based on the blurriness feature and the noise feature of each of the sample images.

3. The method according to claim 2, wherein the constructing multiple training image pairs based on the training image set and the image feature set comprises:
for each of at least a part of the training images in the training image set, performing image enhancement on the training image to obtain the training target image.

4. The method according to claim 3, wherein the performing image enhancement on the training image to obtain the training target image comprises:
performing denoising and/or deblurring processing on the training image to obtain the training target image, and a blurriness and/or noise level of the training target image is lower than that of the training image.

5. The method according to claim 3, wherein the performing image enhancement on the training image to obtain the training target image comprises:
performing bicubic interpolation downsampling on the training image to obtain the training target image.

6. The method according to claim 1, further comprising:
obtaining an input image to be processed;
performing image processing on the input image based on the trained image processing model to generate a processed output image; and
outputting the processed output image,
a resolution of the output image being higher than a resolution of the input image.

7. The method according to claim 6, wherein when an input to be processed is video data, the method further comprises:
performing frame extraction on the video data to obtain multiple input images;
performing the image processing on the multiple input images based on the trained image processing model to generate multiple processed output images; and
synthesizing the multiple processed output images into output video data.

8. The method according to claim 1, wherein the obtaining the training input image corresponding to the training target image based on the training target image and the image feature set comprises:
selecting an image feature from the image feature set;
applying the selected image feature to the training target image; and
performing downsampling on the training target image to obtain the training input image.

9. The method according to claim 8, wherein the obtaining the training input image corresponding to the training target image based on the training target image and the image feature set comprises:
selecting a blurriness feature and a noise feature from the image feature set;
applying the selected a blurriness feature to the training target image to obtain a first training intermediate image with the blurriness added;

performing the downsampling on the first training intermediate image with the blurriness added to obtain a second training intermediate image after the downsampling; and applying the selected noise feature to the second training intermediate image after the downsampling to obtain the training input image.

10. The method according to claim 9, wherein the loss function of the neural network model comprises a reconstruction loss and a perception loss;

the reconstruction loss is an L1 norm distance or an L2 norm distance between a pixel value of an output image of the neural network model and a corresponding pixel value of the training target image; and the perception loss is an L1 norm distance or an L2 norm distance between a low-frequency image feature of the output image of the neural network model and a low-frequency image feature of the training target image.

11. The method according to claim 1, wherein the image processing model comprises a neural network model, and the training the image processing model based on the multiple training image pairs comprises:

using, for each training image pair of the multiple training image pairs, the training input image in the training image pair as an input to the neural network model;

calculating a loss function of the neural network model based on an output of the neural network model and the training target image in the training image pair; and optimizing a network parameter of the neural network model based on the loss function.

12. The method according to claim 11, wherein the neural network model and a discriminator network form a generative adversarial network, and the loss function of the neural network model further comprises an adversarial loss, the adversarial loss is a discriminative output value after the output image of the neural network model is discriminated by the discriminator network.

13. A non-transitory computer-readable storage medium, storing computer-executable instructions, the instructions, when executed by a processor, implementing:

obtaining a sample image set, the sample image set comprising a first number of sample images;

constructing an image feature set based on the sample image set, the image feature set comprising an image feature extracted from each of the sample images in the sample image set, and the image feature comprises a blurriness feature and a noise feature;

obtaining a training image set, the training image set comprising a second number of training images;

constructing multiple training image pairs based on the training image set and the image feature set, each of the training image pairs comprising a training target image and a training input image, comprising: obtaining the training input image corresponding to the training target image based on the training target image and the image feature set, a resolution of the training target image being higher than a resolution of the training input image; and training an image processing model based on the multiple training image pairs.

14. The computer-readable storage medium according to claim 13, wherein the constructing an image feature set based on the sample image set comprises:

extracting the blurriness feature and the noise feature of each of the sample images in the sample image set; and constructing the image feature set based on the blurriness feature and the noise feature of each of the sample images.

15. The computer-readable storage medium according to claim 14, wherein the constructing multiple training image pairs based on the training image set and the image feature set comprises:

for each of at least a part of the training images in the training image set, performing image enhancement on the training image to obtain the training target image.

16. The computer-readable storage medium according to claim 15, wherein the performing image enhancement on the training image to obtain the training target image comprises:

performing denoising and/or deblurring processing on the training image to obtain the training target image, and a blurriness and/or noise level of the training target image is lower than that of the training image.

17. The computer-readable storage medium according to claim 15, wherein the performing image enhancement on the training image to obtain the training target image comprises:

performing bicubic interpolation down sampling on the training image to obtain the training target image.

18. The computer-readable storage medium according to claim 13, wherein the obtaining the training input image corresponding to the training target image based on the training target image and the image feature set comprises:

selecting an image feature from the image feature set;
applying the selected image feature to the training target image; and
performing down sampling on the training target image to obtain the training input image.

19. The computer-readable storage medium according to claim 18, wherein the obtaining the training input image corresponding to the training target image based on the training target image and the image feature set comprises:

selecting a blurriness feature and a noise feature from the image feature set;

applying the selected a blurriness feature to the training target image to obtain a first training intermediate image with the blurriness added;

performing the down sampling on the first training intermediate image with the blurriness added to obtain a second training intermediate image after the down sampling; and applying the selected a noise feature to the second training intermediate image after the downsampling to obtain the training input image.

20. An image processing device, comprising:
a processor; and
a memory, storing computer-executable instructions, the instructions, when executed by the processor, implementing:

obtaining a sample image set, the sample image set comprising a first number of sample images;

constructing an image feature set based on the sample image set, the image feature set comprising an image feature extracted from each of the sample images in the sample image set, and the image feature comprises a blurriness feature and a noise feature;

obtaining a training image set, the training image set comprising a second number of training images;

constructing multiple training image pairs based on the training image set and the image feature set, each of the training image pairs comprising a training target image and a training input image, comprising: obtaining the training input image corresponding to the training target image based on the training target image and the image feature set, a resolution of the training target image being higher than a resolution of the training input image; and training an image processing model based on the multiple training image pairs.

* * * * *